United States Patent
Lee et al.

(10) Patent No.: US 9,153,805 B2
(45) Date of Patent: Oct. 6, 2015

(54) CYLINDRICAL SECONDARY BATTERY

(71) Applicant: LG CHEM, LTD., Seoul (KR)

(72) Inventors: Je-Jun Lee, Daejeon (KR); Sung-Jong Kim, Daejeon (KR); Cha-Hun Ku, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 13/917,708

(22) Filed: Jun. 14, 2013

(65) Prior Publication Data

US 2013/0273401 A1 Oct. 17, 2013

Related U.S. Application Data

(63) Continuation of application No. PCT/KR2012/005630, filed on Jul. 13, 2012.

(30) Foreign Application Priority Data

Jul. 13, 2012 (KR) ........................ 10-2012-0076626

(51) Int. Cl.
*H01M 2/08* (2006.01)
*H01M 2/04* (2006.01)
*H01M 2/12* (2006.01)
*H01M 2/02* (2006.01)
*H01M 2/34* (2006.01)

(52) U.S. Cl.
CPC .............. *H01M 2/08* (2013.01); *H01M 2/0413* (2013.01); *H01M 2/022* (2013.01); *H01M 2/1241* (2013.01); *H01M 2/345* (2013.01); *H01M 2/348* (2013.01); *H01M 2200/106* (2013.01)

(58) Field of Classification Search
CPC .... H01M 2/0413; H01M 2/08; H01M 2/1235
USPC ........................................................... 429/82
See application file for complete search history.

(56) References Cited

U.S. PATENT DOCUMENTS

| 6,025,091 A | 2/2000 | Kondo et al. |
| 7,867,019 B1 | 1/2011 | Loukusa et al. |
| 2004/0041355 A1 | 3/2004 | Suzuki et al. |
| 2004/0058247 A1* | 3/2004 | Omaru .......................... 429/234 |

(Continued)

FOREIGN PATENT DOCUMENTS

| JP | 10-199495 A | 7/1998 |
| JP | 10-261392 A | 9/1998 |

(Continued)

OTHER PUBLICATIONS

Cella (J. Polymer Sci.: Symposium No. 42, 727-740 (1973)).*

(Continued)

*Primary Examiner* — Stewart Fraser
*Assistant Examiner* — Olatunji Godo
(74) *Attorney, Agent, or Firm* — Birch, Stewart, Kolasch & Birch, LLP

(57) ABSTRACT

Provided is a cylindrical secondary battery, comprising an electrode assembly having a cathode plate, an anode plate, and a separator interposed therebetween; a case for receiving the electrode assembly; a cap assembly for sealing an open-end of the case; and a gasket interposed between the case and the cap assembly, wherein the gasket is made of a polymer resin having a melting point of 200° C. or higher and a hardness of 100D or less.

16 Claims, 4 Drawing Sheets

(56) References Cited

U.S. PATENT DOCUMENTS

| | | |
|---|---|---|
| 2006/0093904 A1 | 5/2006 | Cheon et al. |
| 2011/0014812 A1* | 1/2011 | Loukusa et al. ............. 439/500 |
| 2011/0086251 A1* | 4/2011 | Kim et al. ....................... 429/53 |
| 2012/0028090 A1 | 2/2012 | Kyung-Su et al. |

FOREIGN PATENT DOCUMENTS

| | | |
|---|---|---|
| JP | 10-302737 A | 11/1998 |
| JP | 10-302745 A | 11/1998 |
| JP | 11-283588 A | 10/1999 |
| JP | 2003-77431 A | 3/2003 |
| JP | 2003-151516 A | 5/2003 |
| JP | 2006-128121 A | 5/2006 |
| JP | 2006-221909 A | 8/2006 |
| JP | 2008-204839 * | 9/2008 |
| JP | 2011-54380 A | 3/2011 |
| KR | 10-2011-0029061 A | 3/2011 |

OTHER PUBLICATIONS

Wegner et al. (Die Angewandte Makromolekulare Chemie 14 (1978) 295-316 (Nr. 1204)).*

J Van Schooten et al., "Physical and Mechanical Properties of Polypropylene Fractions", Polymer, Jan. 1, 1961, pp. 161-184, XP055165503, DOI: 10.10 16/0032-3861(61)90020-9.

* cited by examiner

CYLINDRICAL SECONDARY BATTERY

CROSS-REFERENCE TO RELATED APPLICATION(S)

This application is a continuation of International Application No. PCT/KR2012/005630 filed on Jul. 13, 2012, which claims priority from Korean Patent Application No. 10-2011-0069510 filed in the Republic of Korea on Jul. 13, 2011 and Korean Patent Application No. 10-2012-0076626 filed in the Republic of Korea on Jul. 13, 2012, the disclosures of which are incorporated herein by reference.

TECHNICAL FIELD

The present invention relates to a cylindrical secondary battery, and more particularly to a cylindrical lithium ion/polymer secondary battery having a gasket made of a high heat-resistant polymer resin.

BACKGROUND ART

Generally, secondary batteries are referred to as rechargeable batteries because they can be charged and discharged repeatedly unlike a primary battery incapable of recharging, and widely used as a power source in electronic devices such as cellular phones, notebook computers and camcorders, or electric vehicles. Particularly, a lithium secondary battery has an operating voltage of 3.6 V or more, which is three times higher than those of Ni—Cd batteries or Ni—H batteries mainly used as the power source of electronic equipments and has excellent energy density characteristics per unit weight, and thus, the use of the lithium secondary battery is rapidly increasing.

Such a lithium secondary battery mainly uses a lithium-based oxide and a carbon material as a cathode active material and an anode active material, respectively. Also, the lithium secondary battery may be classified as a prismatic battery, a cylindrical battery or a pouch-shaped battery.

The lithium secondary battery comprises an electrode assembly having a cathode/separator/anode structure, in which a cathode, a separator and an anode are sequentially disposed, and a cladding for sealing and receiving the electrode assembly together with an electrolyte solution therein. In particular, prismatic or cylindrical secondary batteries comprise, as a cladding, a case having an open end and a cap assembly sealed and welded with the open end of the case.

The electrode assembly may be constructed in a jelly-roll type structure obtained by interposing a separator between a cathode and an anode, followed by winding, or a stacking type structure obtained by interposing separators between multiple cathodes and anodes having a predetermined size, followed by sequentially stacking. The jelly-roll type electrode assembly has a high energy density per unit weight and is easy to manufacture and, in particular, easy to put in a case, thereby being widely used in cylindrical or prismatic batteries. Meanwhile, the stacking type electrode assembly is mainly used in pouch-shaped batteries.

In the charging/discharging process of a secondary battery, such an electrode assembly is apt to be deformed by repeated expansion and shrinkage. In the case of the jelly-roll type electrode assembly, stress may be concentrated in the center of the battery, making the electrode penetrate a separator and be in contact with a central metallic pin, thereby causing a short circuit. The short circuit may result in the heating of the battery, from which an organic solvent is decomposed to generate gas and increase the inner pressure of the battery, thereby bursting the cladding thereof. Such a gas pressure increase in the battery may also be caused by a short circuit due to external impact.

Such a safety problem of batteries may be overcome by the provision of a positive temperature coefficient (PTC) device (a safety device). In particular, a cylindrical battery comprises safety devices such as a current interrupt device (CID) for interrupting a current when the inner pressure of the battery increases, and a cap assembly which includes a top-cap constituting a protruded terminal for protecting the safety devices, and the cap assembly is sealed by a gasket to be fitted with a case.

However, while assembling the cap assembly with the case by the gasket, a gap may be formed between the gasket and the cap assembly or between the gasket and the case. By the formation of such a gap, there has often been a problem that the sealability of a conventional secondary battery deteriorates. That is, the gasket is generally pressed and deformed by the case by way of a clamping process, thereby making a close contact between the case and the cap assembly. However, since the surface of a conventional gasket that comes in contact with the case and the cap assembly therebetween is a simple flat surface, the contact becomes poor. Particularly, if the gasket is ununiformly pressed during the clamping of the case, the flat surfaces of the gasket is unevenly deformed and a part of the gasket does not come in contact with the case or cap assembly to form a space therebetween, thereby deteriorating the sealability of the gasket with the case. Accordingly, there has been a demand to develop a sealing structure between a cap assembly and a gasket.

Also, if a cylindrical battery having a cross section larger than the thickness of its case is exposed under a high temperature condition, a low-boiling-point solvent in an electrolyte solution may vaporize to increase the inner pressure of the battery and expand the battery case. Furthermore, the characteristics of the battery may be deteriorated by the leakage of the electrolyte solution and the increase of inner resistance due to the inlet of external air and humidity.

In order to overcome these problems, there is a need to improve the heat resistance of a gasket and an organic electronic material such as a sealant.

DISCLOSURE

Technical Problem

The present invention is designed to solve the problems of the prior art, and therefore it is an object of the present invention to provide a cylindrical secondary battery having a gasket made of a high heat-resistant polymer resin, which can prevent a short circuit due to thermal deformation even though the gasket is exposed under a high temperature environment as the inner temperature of the secondary battery increases, and can improve sealability.

Also, it is another object of the present invention to provide a cylindrical secondary battery further having a structure configured to more completely seal an initial leakage area of an electrolyte solution and/or gas, i.e., an interface between a gasket and a cap assembly comprising a safety vent.

Technical Solution

In order to accomplish the above object, in accordance with one aspect of the present invention, there is provided a cylindrical secondary battery, comprising:

an electrode assembly having a cathode plate, an anode plate, and a separator interposed therebetween;

a case for receiving the electrode assembly;
a cap assembly for sealing an open-end of the case; and
a gasket interposed between the case and the cap assembly,
wherein the gasket is made of a polymer resin having a melting point of 200° C. or higher and a hardness of 100D or less, and comprising 10 to 30 mol % of a repeating unit represented by formula (I) and 70 to 90 mol % of a repeating unit represented by formula (II):

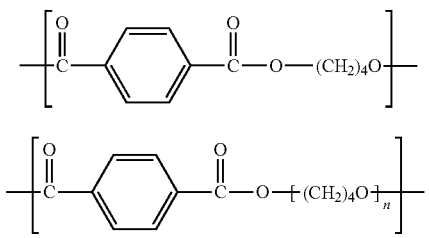

wherein n is an integer of 100 to 250.

The gasket may further comprise an asphalt coating layer on the surface thereof.

In accordance with another aspect of the present invention, there is provided a cylindrical secondary battery, comprising:
an electrode assembly having a cathode plate, an anode plate, and a separator interposed therebetween;
a case for receiving the electrode assembly;
a cap assembly for sealing an open-end of the case; and
a gasket interposed between the case and the cap assembly, the gasket being bent to have two transverse surfaces facing each other, in which one transverse surface of the gasket has an uneven structure formed thereon and the other transverse surface thereof has a protruded structure formed thereon, and an edge of the cap assembly is inserted between the uneven structure and the protruded structure,
wherein the gasket is made of a polymer resin having a melting point of 200° C. or higher and a hardness of 100D or less.

The polymer resin may be selected from the group consisting of a thermoplastic polyester elastomer (TPEE), a tetrafluoride-perfluoroalkylvinylether copolymer (PFA), polybutylene terephthalate (PBT) and a mixture thereof.

The cap assembly may comprise a top-cap for sealing an open-end of the case and disposed to be in contact with the protruded structure of the gasket; a PTC device disposed to be in contact with the top-cap; and a safety vent disposed to be in contact with the PTC device on one surface thereof while being in contact with the uneven structure of the gasket on a part of the other surface thereof, the safety vent being electrically connected with the electrode assembly.

The cap assembly may comprise a top-cap for sealing an open-end of the case; and a safety vent configured to be bent at both ends thereof, its one surface being in contact with all of the side, top and bottom surfaces of the top-cap, while its other surface being in contact with the uneven structure and protruded structure formed on the inner circumference surface of the gasket, and the safety vent being electrically connected with the electrode assembly.

The cap assembly may further comprise a current interrupt device whose top is welded to the bottom of the safety vent and bottom is connected with the electrode assembly.

The cylindrical secondary battery may further comprise an auxiliary gasket for surrounding the outer circumference surface of the current interrupt device, as well as the gasket inserting the edge of the cap assembly therein.

The gasket inserting the edge of the cap assembly therein may surround the auxiliary gasket and the bottom surface of the current interrupt device.

The gasket inserting the edge of the cap assembly therein may surround the auxiliary gasket and the top surface of the current interrupt device.

The cylindrical secondary battery may further comprise an auxiliary gasket interposed between the safety vent and the current interrupt device to hold them in a mutually fitted state, as well as the gasket inserting the edge of the cap assembly therein.

The gasket inserting the edge of the cap assembly therein may have an inclined or stepped structure in which a terminal of the current interrupt device is placed to further hold the current interrupt device between the safety vent and the gasket.

The uneven structure and protruded structure of the gasket may have a triangular, rectangular, trapezoidal or semicircular cross-section.

The uneven structure and protruded structure of the gasket may further comprise a barb-shaped portion.

The safety vent may be made of a metal.

Advantageous Effects

The cylindrical secondary battery according to one aspect of the present invention comprises a gasket made of a polymer resin having a high heat resistance and a moderate hardness, thereby preventing a short circuit due to thermal deformation even though the gasket is exposed under a high temperature environment as the inner temperature of the secondary battery increases, and preventing the deterioration of sealability. Also, the cylindrical secondary battery has an uneven structure and a protruded structure in a leakage area of an electrolyte solution or gas, i.e., in two facing sides of the gasket being in contact with a cap assembly, to enhance binding force between contact surfaces and increase the migration length of the electrolyte solution or gas through said structures, thereby surprisingly improving the sealability of the secondary battery even though external impact and inner pressure increase.

DESCRIPTION OF DRAWINGS

The accompanying drawing illustrates a preferred embodiment of the present invention and, together with the foregoing disclosure, serves to provide further understanding of the technical spirit of the present invention. However, the present invention is not to be construed as being limited to the drawings.

BEST MODE

Figure 1:
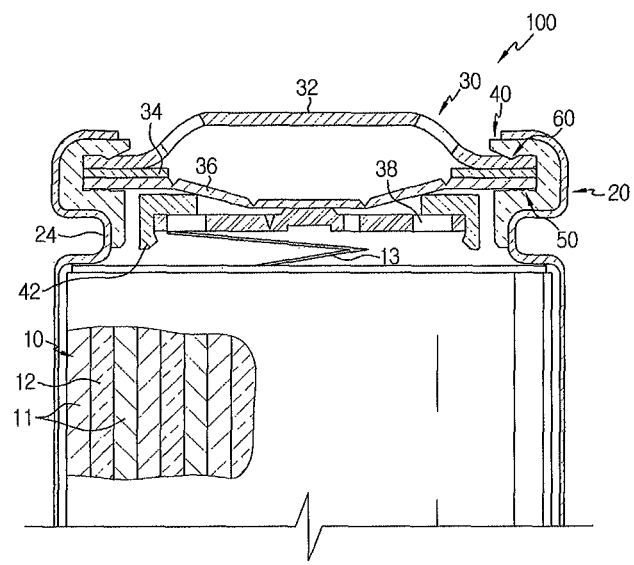
FIG. 1 is a cross-sectional view schematically showing a configuration of a cylindrical secondary battery according to one embodiment of the present invention.

Hereinafter, preferred embodiments of the present invention will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present invention on the basis of the principle that the inventor is allowed to define terms appropriately for the best explanation. Therefore, the description proposed herein is just a preferable example for the purpose of illustrations only, not intended to limit the scope of the present invention, so it should be understood that other equivalents and modifications could be made thereto without departing from the spirit and scope of the present invention.

The cylindrical secondary battery according to one aspect of the present invention comprises an electrode assembly having a cathode plate, an anode plate, and a separator interposed therebetween; a case for receiving the electrode assembly; a cap assembly for sealing an open-end of the case; and a gasket interposed between the case and the cap assembly, wherein the gasket is made of a polymer resin having a melting point of 200° C. or higher and a hardness of 100D or less, and comprising 10 to 30 mol % of a repeating unit represented by formula (I) and 70 to 90 mol % of a repeating unit represented by formula (II):

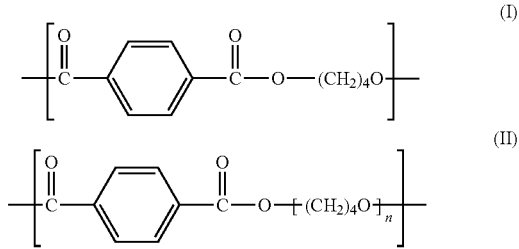

wherein n is an integer of 100 to 250.

The gasket is made of a polymer resin having electric insulation, impact resistance, elasticity and durability. In particular, the gasket should have a good chemical resistance to an electrolyte solution for preventing the leakage of the electrolyte solution and a high heat resistance for maintaining the sealability of the gasket under the severe conditions of high temperature and high humidity inside batteries.

Accordingly, in the cylindrical secondary battery according to one aspect of the present invention, the polymer resin forming the gasket has a melting point of 200° C. or higher, preferably 200 to 350° C., more preferably 200 to 310° C.

When the polymer resin satisfies such melting point range, the fluidity of the polymer resin may not occur at a temperature lower than the melting point thereof in over-heating due to a short circuit generated in secondary batteries or external environments, thereby preventing a structural deformation at a contact area between the gasket and the cap assembly, and thus improving the sealability of the gasket.

Also, the polymer resin has a hardness of 100D or less, preferably 40 to 100D, more preferably 60 to 90D, according to a Shore hardness measurement.

The Shore hardness defined by Albert F. Shore (USA) in 1906 is represented by the rebound height of a diamond-tipped hammer perpendicularly dropped from a fixed height onto a sample.

When the polymer resin satisfies such hardness range, a gap may not form when the gasket is in contact with the cap assembly, the sealability of the gasket will improve, and reduce a fault in assembling the secondary battery.

The polymer resin is an example of thermoplastic polyester elastomers, in which a hard segment represented by formula (I) and a soft segment represented by formula (II) may be regularly or irregularly repeated alternately.

That is, the hard segment may comprise a crystalline polybutylene terephthalate obtained from 1,4-butylene glycol and terephthalic acid or dimethyl phthalate, and the soft segment may comprise an amorphous polyether (polytetra-methylene glycol).

The polymer resin may be prepared by a conventional polymerization and condensation method which is well known in the art.

The polymer resin comprises 10 to 30 mol % of a repeating unit represented by formula (I) and 70 to 90 mol % of a repeating unit represented by formula (II), preferably 12.5 to 27.5 mol % of a repeating unit represented by formula (I) and 72.5 to 87.5 mol % of a repeating unit represented by formula (II), more preferably 15 to 25 mol % of a repeating unit represented by formula (I) and 75 to 85 mol % of a repeating unit represented by formula (II).

When the repeating unit represented by formula (I) and the repeating unit represented by formula (II) satisfy such content (mol %) range, the hardness of the polymer resin is maintained in a moderate level to exhibit low hardness characteristics, and the polymerization time of the polymer resin may be properly controlled.

The polymer resin has a weight average molecular weight of 10,000 to 500,000, preferably 20,000 to 300,000, more preferably 50,000 to 250,000.

When the polymer resin satisfies such weight average molecular weight range, the gasket made of the polymer resin may be protected against its structural deformation at a contact area with the cap assembly, thereby improving the sealability of the gasket.

The gasket may further comprise an asphalt coating layer on its surface being in contact with the cap assembly.

In the asphalt coating layer, any one of asphalt materials having a desired sealable property, which can prevent the penetration of moisture or the leakage of an electrolyte solution, may be used without a particular limitation. However, if the above asphalt material is coated on the gasket, the asphalt material is required to have some degree of viscosity and a corresponding moderate ductility because an asphalt material having an excessive ductility may cover the uneven and protruded structures formed on the gasket during its coating process, making the gasket and the cap assembly difficult to form a close contact therebetween and actually deteriorate the sealability of a battery.

The asphalt material may be selected from the group consisting of coal tar peach, straight asphalt pitch, blown asphalt pitch, and a mixture thereof, but is not particularly limited thereto.

The cylindrical secondary battery according to another aspect of the present invention comprises an electrode assembly having a cathode plate, an anode plate, and a separator interposed therebetween; a case for receiving the electrode assembly; a cap assembly for sealing an open-end of the case; and a gasket interposed between the case and the cap assembly, the gasket being bent to have two transverse surfaces facing each other, in which one transverse surface of the gasket has an uneven structure formed thereon and the other transverse surface thereof has a protruded structure formed thereon, and an edge of the cap assembly is inserted between the uneven structure and the protruded structure, wherein the gasket is made of a polymer resin having a melting point of 200° C. or higher and a hardness of 100D or less.

The polymer resin may be selected from the group consisting of a thermoplastic polyester elastomer (TPEE), a tetrafluoride-perfluoroalkylvinylether copolymer (PFA), polybutylene terephthalate (PBT) and a mixture thereof, but is not limited thereto.

In accordance with one embodiment of the present invention, the cap assembly comprises a top-cap for sealing an open-end of the case and disposed to be in contact with the protruded structure of the gasket; a PTC device disposed to be in contact with the top-cap; and a safety vent disposed to be in contact with the PTC device on one surface thereof while being in contact with the uneven structure of the gasket on a part of the other surface thereof, the safety vent being electrically connected with the electrode assembly.

As mentioned above, since an electrolyte solution or gas is possibly leaked in an interface between the cap assembly and the gasket, particularly, an interface between the gasket and the safety vent, the formation of the uneven structure can prevent the leakage of the electrolyte solution or gas in the interface until the safety vent is ruptured, thereby surprisingly improving the safety of the battery.

The uneven structure improves binding force between the cap assembly and the gasket when the cap assembly is assembled with the case of the battery together with the gasket interposed therebetween by way of a mechanical press process (clamping process) because the uneven structure formed on the top and bottom surfaces of the gasket increases the contact area of the metallic top-cap and the safety vent, and thus enhances a close contact property between the cap assembly and the gasket.

The uneven structure formed in the gasket may be further formed on the surface of the cap assembly being in contact with the gasket. Thus, the formation of the uneven structure on the surfaces of both the gasket and the cap assembly being in contact with each other can more increase the binding force between the gasket and the cap assembly.

The uneven structure may be any form capable of strengthening the binding force between the gasket and the cap assembly without a particular limitation to its position, size and shape. For example, the uneven structure may have a triangular, rectangular, trapezoidal or semicircular cross-section.

Also, the protruded structure formed in the gasket, which may have a triangular, rectangular, trapezoidal or semicircular cross-section, may increase a contact area between the gasket and the top surface of the cap assembly, i.e., the top-cap when assembling with the case of the battery, and can improve binding force, close contact property (fixation) and morphology engagement between contact interfaces because the protruded structure is much compressed as compared to other parts. In addition, the protruded structure may further comprise a barb-shaped portion having a sharp curved point, such as a fish hook, near the end of the protrusion to improve binding force and/or close contact property between the interfaces.

Further, a secondary battery according to another embodiment of the present invention may have an additional uneven structure formed on either the surface of the case being in contact with the gasket or the surface of the gasket to prevent a leakage in the cap part. The additional protruded structure is to prevent an electrolyte solution or gas from leaking through an interface between the gasket and the case, independent of the foregoing protruded structure.

The safety vent plays a role of interrupting a current or exhausting gas when the inner pressure of the battery increases, and is preferably made of a metal. The thickness of the safety vent may vary depending on the material and structure thereof, and is not particularly limited so far as it may be ruptured to exhaust gas when a certain degree of high pressure is caused in the battery. For example, the thickness of the safety vent may be 0.2 to 0.6 mm.

The PTC device plays a role of interrupting a current by raising a battery resistance when the inner temperature of the battery increases. The thickness of the PTC device may also vary depending on the material and structure thereof, for example, it may be 0.2 to 0.4 mm. If the thickness of the PTC device is too thick, the inner resistance thereof rises and the size of the battery increases, so the capacity of the battery may be reduced as compared to an equivalent size of other batteries. On the contrary to this, if the thickness of the PTC device is too thin, a desired current-interrupting effect is difficult to be obtained at a high temperature and the PTC device may break even by weak external impact. Therefore, based on these matters, the thickness of the PTC device may be properly determined within the foregoing range.

The thickness of the top-cap part being in contact with the PTC device is not particularly limited within a range allowing the protection of several components of the cap assembly against an external pressure, for example, it may be 0.3 to 0.5 mm. If the thickness of the top-cap part is too thin, a desired mechanical hardness is difficult to be obtained. On the contrary to this, if the thickness of the top-cap part is too thick, the size and weight thereof increase, so the capacity of the battery may be reduced as compared to an equivalent size of other batteries.

A secondary battery comprising the cap assembly having the tap-cap, PTC device and safety vent as mentioned above may be used as a power supply of cellular phones and notebook computers to provide a stable and constant output.

However, the secondary battery configured to have the tap-cap, PTC device and safety vent may be difficult to provide a high output in a moment, and may be somewhat difficult to provide uniform output due to the resistance change of a contact surface by external impact such as vibration. More specifically, the PTC device generally exhibits an electric resistance of about 7 to 32 mΩ at room temperature, and its resistance may rapidly rise as a temperature increases, thereby hindering the provision of a high output in a moment. Also, when external impact such as vibration is applied, the contact surfaces of the PTC device and safety vent are subject to their large resistance change, from which uniform output cannot be provided.

Accordingly, a cap assembly according to another embodiment of the present invention comprises a top-cap for sealing an open-end of the case; and a safety vent configured to be bent at both ends thereof, its one surface being in contact with all of the side, top and bottom surfaces of the top-cap, while its other surface being in contact with the uneven structure and protruded structure formed on the inner circumference surface of the gasket, and the safety vent being electrically connected with the electrode assembly.

A secondary battery having such a cap assembly can provide a high output in a moment when used as a power source of power tools such as an electric drill and have stability against external physical impact such as vibration and dropping.

In this case, the uneven structure of the gasket can strengthen binding force between the gasket and the cap assembly, and the protruded structure thereof is bent to surround the top-cap, thereby improving binding force, close contact property and morphology engagement between interfaces of the gasket and the safety vent being in contact with the top surface of the top-cap. Particularly, in the cap assembly configured to surround the top-cap by the safety vent being bent, the contact surface of the safety vent and the top-cap may have one or more welding joints formed therein. The welding joints may be formed simultaneously in radial symmetrical points, for example, 2, 4, 6 or 8 symmetrical points. The term "welding" which is used herein includes a laser, ultrasonic and resistance welding process, as well as a connection method by soldering. The welding may be conducted while assembling the cap assembly and after setting the cap assembly in a case.

The top surface of the safety vent having the welding joints is not smooth and somewhat unevenly irregular, and thus the protruded structure formed on the perpendicular and horizontal surface of the top in the gasket may be firmly engaged with the uneven surface, thereby effectively preventing the leakage of an electrolyte solution.

In addition, the secondary battery having the above-mentioned cap assembly may have an additional uneven structure formed on either the surface of the case being in contact with the gasket or the surface of the gasket to prevent a leakage in the cap part.

In conventional cylindrical secondary batteries, a cathode lead welded to the cathode foil of a jelly-roll type electrode assembly is electrically connected with a cap assembly to be coupled to the protruded terminal formed in the top of a top-cap, while an anode lead welded to an anode foil is welded to the sealing end of a case, so the case itself constitutes an anode terminal. The case is not particularly limited to its material, and may be made of stainless steel, steel, aluminum or an equivalent thereof. The secondary battery is assembled by receiving an electrode assembly in a case, introducing an electrolyte solution in the case and mounting a cap assembly on the open-end of the case, followed by sealing.

A secondary battery according to one embodiment of the present invention may be a lithium (ion) secondary battery having high energy density, discharging voltage and output stability. The lithium secondary battery consists of a cathode, an anode, a separator, a non-aqueous electrolyte solution containing a lithium salt, etc. The cathode is prepared by applying a mixture of a cathode active material, a conductive material and a binder on a cathode current collector, followed by drying, and if necessary a filler may further be added thereto. The anode is prepared by applying and drying an anode active material on an anode current collector, and if necessary the foregoing components may further be added thereto. The separator is interposed between the anode and the cathode, and may be made of a thin insulating film having a high ion permeability and mechanical strength. In the lithium salt-containing non-aqueous electrolyte solution, a non-aqueous liquid electrolyte, a solid electrolyte or a polymer solid electrolyte may be used as a non-aqueous electrolyte. Herein, the detailed description of the current collector, electrode active material, binder, separator, electrolyte solution and lithium salt widely known in the art is omitted.

Hereinafter, a cylindrical secondary battery according to one embodiment of the present invention will be described in detail with reference to the accompanying drawings.

FIG. 1 is a cross-sectional view schematically showing a configuration of a secondary battery according to one embodiment of the present invention.

Referring to FIG. 1, a secondary battery 100 according to one embodiment of the present invention comprises a cylindrical case 20 for receiving an electrode assembly 10 and an electrolyte solution; a cap assembly 30 for sealing an open-end of the case 20 to be mounted thereto; a gasket 40 interposed between the case 20 and the cap assembly 30; an uneven structure 50 formed on one side of the gasket 40 being in contact with the bottom of a safety vent 36; and a protruded structure 60 formed on the other facing side of the gasket 40 being in contact with the top edge of a top-cap 32.

The electrode assembly 10 comprises two roll-type wide electrode plates 11 having different polarities; and a separator 12 interposed between the electrode plates or disposed in the left or the right of any one of the electrode plates 11 so as to insulate the electrode plates 11 with each other, and is preferably wound in the form of a so-called 'jelly roll structure'. Also, a certain standard of a cathode plate, an anode plate and a separator therebetween may be stacked.

Each of the two electrode plates 11 is configured by applying an active material slurry on a current collector made of a metal foil or metal mesh containing aluminum and copper. The slurry is conventionally formed by dissolving active material particles, an auxiliary conductor and a plasticizer in a solvent, followed by stirring. The solvent is removed in a subsequent process. The starting end and the terminating end of the current collector in the direction of winding the electrode plates may have no slurry thereon. In the parts having no slurry, a pair of leads which corresponds to each of the electrode plates 11 are attached. A first lead 13 attached in the top of the electrode assembly 10 is electrically connected to the cap assembly 30, and a second lead (not shown) attached in the bottom of the electrode assembly 10 is connected to the bottom of the case 20. Of course, both the first lead 13 and the second lead may be drawn out in the direction of the cap assembly 30.

It is preferred that the electrode assembly 10 is disposed on a first insulating plate (not shown) installed in the bottom of the case 20, and a second insulating plate (not shown) is disposed on the top of the electrode assembly 10. The first insulating plate insulates the electrode assembly 10 from the bottom of the case 20, and the second insulating plate insulates the electrode assembly 10 from the cap assembly 30.

The case 20 is made of a light metallic conductive material such as aluminum and an aluminum alloy and has a cylindrical structure having an open top and an opposing sealed bottom. The inner space of the case 20 is occupied by the electrode assembly 10 and an electrolyte solution (not shown). The electrolyte solution is to transport lithium ions produced by the electrochemical reaction of the electrode plates 11 in the charging/discharging process of the secondary battery 100. The electrolyte solution may be a non-aqueous organic electrolyte solution which is a mixture of a lithium salt and an organic solvent having a high purity, or a polymer electrolyte solution using a polymer electrolyte, but is not limited thereto.

Meanwhile, the case 20 may be provided with a center pin (not shown) in the center thereof to prevent the unwinding of the electrode assembly 10 wound in a jelly roll form and act as a transfer passage for gas in the secondary battery 100. In the top of the case 20, i.e., the upper portion of the top of the electrode assembly 10, a beading portion formed by pressing and bending inwardly from the outside may be provided to prevent the up-and-down movement of the electrode assembly 10.

The cap assembly 30, which is assembled in the opening of the case in the sealing state after interposing the gasket 40, comprises a top-cap 32, a PTC device 34, a safety vent 36 and a current interrupting device (CID) 38. The top-cap 32 has an electrode socket (not shown) for an electrical contact with the outside. The PTC device 34 is to interrupt the current of the battery 100 in the overheating of the battery 100. The safety vent 36 is convexly protruded in the center thereof and welded to the CID 38. The CID 38 may be deformed together with the safety vent 36 by the inner pressure of the secondary battery 100, and may be divided into a CID gasket and a CID filter.

The gasket 40 is configured in a cylindrical form having openings at both ends thereof as a whole, and its one end toward the inside of the case 20 preferably has a structure perpendicularly bent toward the center thereof, thereby being mounted on the opening of the case 20, i.e., a clamping area. The other fore-end of the gasket 40, which is first stretched in the axial direction of the gasket 40, is perpendicularly bent toward the center thereof in a press process for the binding with the case 20, such that the inner and outer circumference surfaces of the gasket are folded to be in contact with the top-cap of the cap assembly 30 and the inner side surface of the case 20, respectively. The gasket 40 is made of a polymer resin having electric insulation, impact resistance, elasticity and durability characteristics. The polymer resin has a melting point of 200° C. or higher and a hardness of 100D or less.

The uneven structure 50 is formed on one side of the gasket 40 being in contact with the safety vent 36 and has a triangular cross-section. Also, an additional uneven structure may further be provided in the bottom surface of the safety vent 36. Meanwhile, the protruded structure 60 is formed on the surface of the gasket 40 being in contact with the top surface of a top-cap 32, and has a triangular cross-section. Such uneven and protruded structures may have a rectangular, trapezoidal or semicircular cross-section, as well as the triangular cross-section.

The uneven structure 50 and the protruded structure 60 formed in the gasket 40 are engaged to each other for a close contact, thereby more strengthening the sealable binding force between the cap assembly 30 and the gasket 40. Accordingly, when the inner pressure of the secondary battery 100 is generated, the uneven structure 50 and the protruded structure 60 prevent an electrolyte solution or gas from leaking to the top of the cap assembly 30 until the safety vent 36 is ruptured.

Also, if necessary, an auxiliary gasket 42 may further be provided, as well as the gasket 40 inserting the edge of the cap assembly therein.

The auxiliary gasket 42 is for the current interrupt device 38 and is configured to surround the outer circumference surface of the current interrupt device 38. Particularly, the auxiliary gasket 42 is in contact with the top and the side of the current interrupt device 38 on the outer circumference surface thereof to support the top and the side of the current interrupt device 38. Also, the auxiliary gasket 42 plays a role of electrically insulating the current interrupt device 38 from the safety vent 36, except of the contact part between the protruded structure of the safety vent 36 and the current interrupt device 38.

Figure 2:
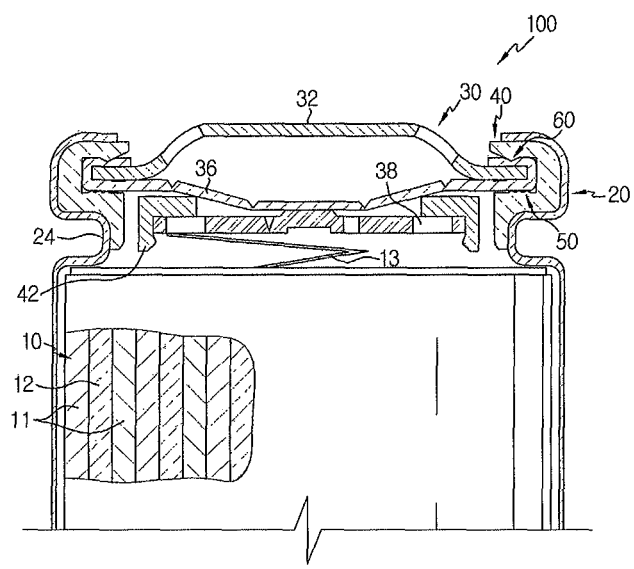
FIG. 2 is a cross-sectional view schematically showing a configuration of a cylindrical secondary battery according to another embodiment of the present invention.

FIG. 2 is a cross-sectional view schematically showing a configuration of a cylindrical secondary battery according to another embodiment of the present invention. The same reference numerals as FIG. 1 are regarded as indicating the elements having the same function as those thereof.

Referring to FIG. 2, in a secondary battery 100 according to a modified embodiment of the present invention, a PTC device is not interposed between a top-cap and a safety vent, a safety vent 36 is configured to be bent to directly surround a top-cap 32. An uneven structure 50 is formed on one surface of a gasket 40 being in contact with the bottom surface of the safety vent 36, and a protruded structure 60 is formed on one surface of the gasket 40 being in contact with the top surface of the top-cap 32. As mentioned above, such uneven and protruded structures may have a rectangular, trapezoidal or semicircular cross-section, as well as the triangular cross-section.

Figure 3:
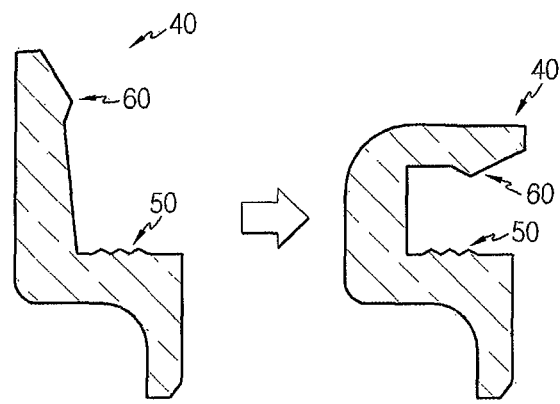
FIG. 3 is a cross-sectional view schematically showing a gasket used in a cylindrical secondary battery according to one embodiment of the present invention.

FIG. 3 is a cross-sectional view schematically showing a gasket used in a cylindrical secondary battery according to one embodiment of the present invention before and after a press process. That is, one fore-end of the gasket 40 is at first stretched in the axial direction of the cylindrical gasket 40 (the left of FIG. 3), and then is perpendicularly bent toward the center thereof in a press process for the binding with the case 20, thereby being provided with the protruded structure 60 in the top surface of the gasket and the uneven structure 50 having two or more uneven shapes in the facing bottom surface thereof (the right of FIG. 3). The uneven structure 50 and the protruded structure 60 are closely coupled and pressed with the top-cap or the safety vent in the assembling of the battery and thus may be actually observed.

Figure 4:
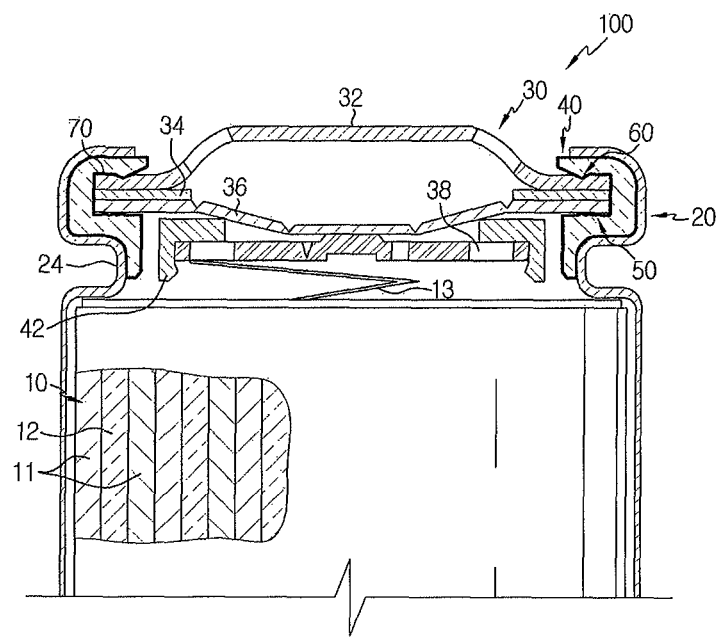
FIG. 4 is a cross-sectional view schematically showing a configuration of a cylindrical secondary battery according to still another embodiment of the present invention.

FIG. 4 is a cross-sectional view schematically showing a configuration of a cylindrical secondary battery according to still another embodiment of the present invention. The same reference numerals as FIG. 1 are regarded as indicating the elements having the same function as those thereof. Referring to FIG. 4, an asphalt coating layer 70 is provided in the inner circumference surface of a gasket 40 inserting the edge of a cap assembly therein and a part of a case.

Figure 5:
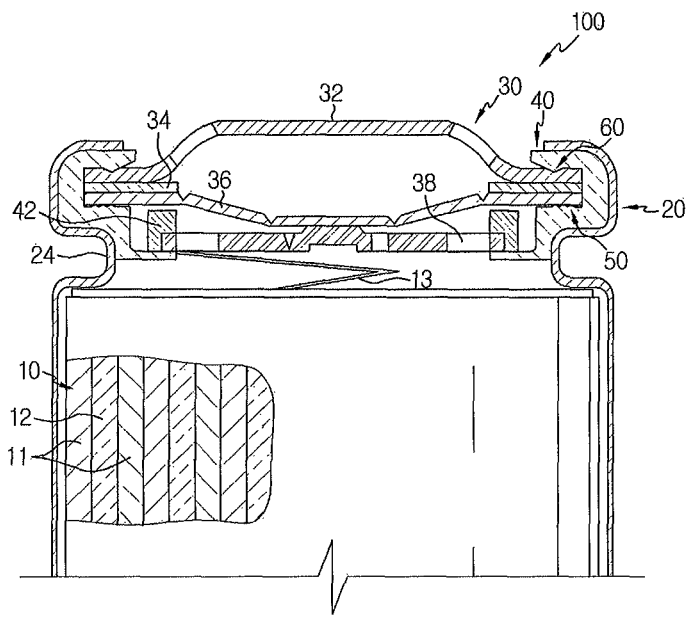
FIG. 5 is a cross-sectional view schematically showing a configuration of a cylindrical secondary battery according to still another embodiment of the present invention.

FIG. 5 is a cross-sectional view schematically showing a configuration of a cylindrical secondary battery according to still another embodiment of the present invention. The same reference numerals as FIG. 1 are regarded as indicating the elements having the same function as those thereof. Referring to FIG. 5, in a cap assembly 30, the lower portion of a gasket 40 is extended to the bottom of a current interrupting device 38 to surround the bottom of the current interrupting device 38. Accordingly, the gasket 40 is used together with an auxiliary gasket 42 to support and protect the current interrupting device 38. Furthermore, in the configuration of the gasket 40, when impact is applied to the side of a case 20, thereby causing the case to be inwardly deformed, the lower portion of the gasket 40 moves inwardly from the bottom of the current interrupting device 38 to firmly surround and support the bottom of the current interrupting device 38.

Figure 6:
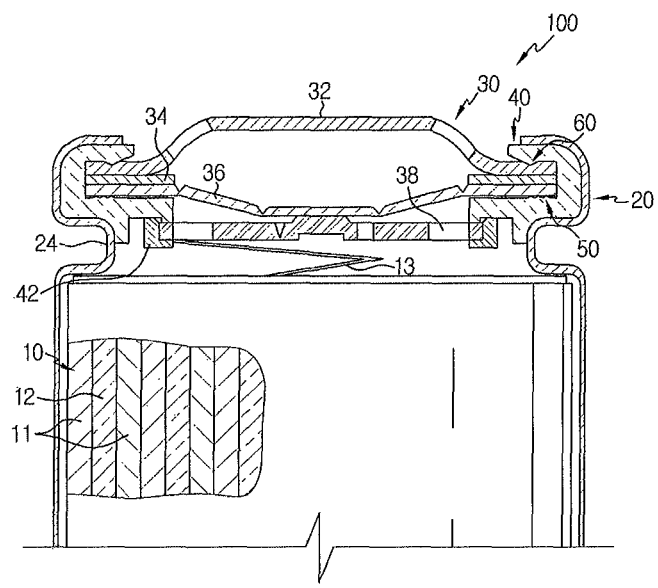
FIG. 6 is a cross-sectional view schematically showing a configuration of a cylindrical secondary battery according to still another embodiment of the present invention.

FIG. 6 is a cross-sectional view schematically showing a configuration of a cylindrical secondary battery according to still another embodiment of the present invention. The same reference numerals as FIGS. 1 and 5 are regarded as indicating the elements having the same function as those thereof. Referring to FIG. 6, in a cap assembly 30, the lower portion of a gasket 40 is extended to the top of a current interrupting device 38 to surround the top of the current interrupting device 38, and an auxiliary gasket 42 is configured to surround the bottom of the current interrupting device 38. Accordingly, the gasket 40 is used together with an auxiliary gasket 42 to support and protect the current interrupting device 38.

Figure 7:
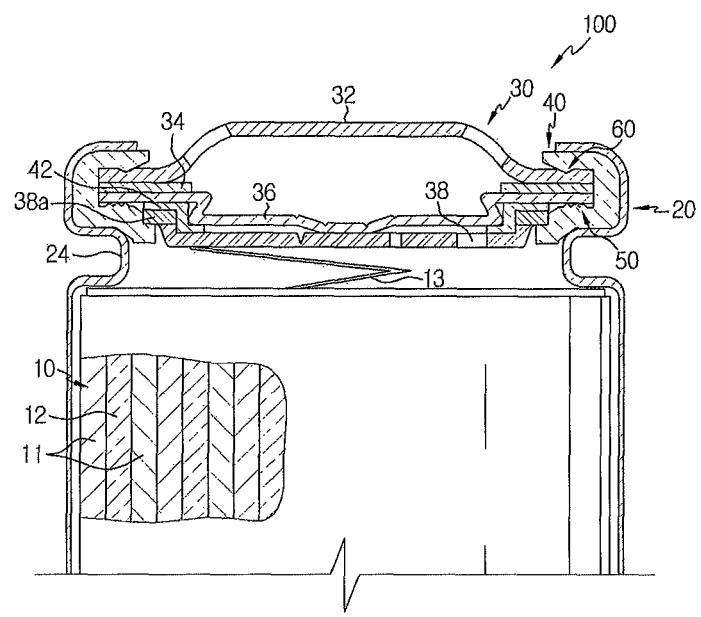
FIG. 7 is a cross-sectional view schematically showing a configuration of a cylindrical secondary battery according to still another embodiment of the present invention.

FIG. 7 is a cross-sectional view schematically showing a configuration of a cylindrical secondary battery according to still another embodiment of the present invention. The same reference numerals as FIG. 1 are regarded as indicating the elements having the same function as those thereof. Referring to FIG. 7, a cap assembly 30 is configured to have a top-cap 32, a PTC device 34, a safety vent 36 and a current interrupting device 38 being in close contacts in the inside of a gasket 40 installed in a beading portion 24 of a case 20. Also, an auxiliary gasket 42 may be further provided by being interposed between the safety vent 36 and the current interrupt device 38 to hold them in a mutually fitted state, as well as the gasket inserting the edge of the cap assembly therein. That is, the auxiliary gasket 42 is disposed between the protruded fitting area having a "Z"-shape which is formed between the top of the current interrupt device 38 and the safety vent 36, to support and protect the current interrupt device 38.

The gasket 40 may have an inclined or stepped structure in which a terminal 38a of the current interrupt device 38 is placed to further hold the current interrupt device 38 between the safety vent and the gasket.

Hereinafter, the present invention will be described in detail through specific examples. However, it should be understood that the present invention is not restricted by the specific Examples.

Example 1

A top-cap and a cylindrical case were first prepared by using a Ni-plated SPCE (cold rolled steel sheet). In the cylindrical case, an electrode assembly was equipped, and then a beading process was conducted on the part of the cylindrical case corresponding to the top of the electrode assembly to form a clamping portion. In the inner side of the clamping portion, a gasket having an uneven structure consisting of three triangular cross-sectional uneven shapes on the upper portion of its bent inner circumference surface and having a protruded structure on the lower portion thereof was inserted, the gasket being made of a thermoplastic polyester elastomer (TPEE) resin having a melting point of 208° C. and a Shore hardness of 65D, comprising 20 mol % of a repeating unit represented by formula (I) and 80 mol % of a repeating unit represented by formula (II), and having a weight average molecular weight of 100,000:

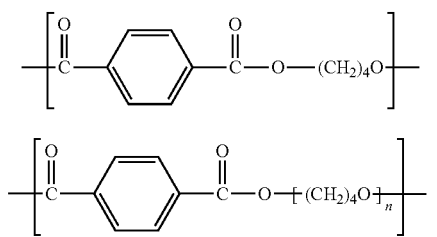

wherein n is 200.

Next, a current interrupting was equipped in the case and welded with a safety vent by way of a laser welding using a power increased by about 5% higher than a conventional rated welding power. Subsequently, a PTC device and the top-cap were equipped, the top end of the case was internally bent, and then a clamping and pressing process was conducted to prepare a cylindrical secondary battery according to the 18650 standard (diameter 18 mm, length 65 mm). The same procedure as the above was repeated to prepare a total of ten cylindrical secondary batteries.

Example 2

The procedure of Example 1 was repeated except that a gasket made of tetrafluoride-perfluoroalkylvinylether copolymer (PFA) having a melting point of 306° C. and a Shore hardness of 60D was used, to prepare a total of ten cylindrical secondary batteries.

Example 3

The procedure of Example 1 was repeated except that a gasket made of polybutylene terephthalate (PBT) having a melting point of 224° C. and a Shore hardness of 90D was used, to prepare a total of ten cylindrical secondary batteries.

Comparative Example

The procedure of Example 1 was repeated except that a gasket made of polypropylene having a melting point of 165° C. and a Shore hardness of 85D was used, to prepare a total of ten cylindrical secondary batteries.

Experimentation for Heat Resistance Test

Each cylindrical secondary battery prepared in Examples 1 to 3 and Comparative Example 1 was stored in a hot chamber set to 200° C. for 1 hour and then evaluated for its heat resistance.

As a result, in all ten cylindrical batteries of Comparative Example 1 using a conventional polypropylene gasket, the gasket was fused to cause the contact of the case and the top-cap, thereby generating a short circuit.

In contrast, in all cylindrical secondary batteries of Examples 1 to 3, each gasket maintained its shape as it is, and a short circuit due to the contact of the case and the top-cap was not generated.

Experimentation for Drop Test

Each cylindrical secondary battery prepared in Examples 1 to 3 and Comparative Example 1 was dropped to a concrete ground at a height of 1 m. Such a free-fall was repeated ten times, and then the secondary battery was observed for the leakage of an electrolyte solution. The observation of the leakage was first visually conducted for the outside of the secondary battery, and if it is difficult to determine visually, the weight change of the secondary battery before and after the drop test was measured. The results thereof are shown in Table 1.

TABLE 1

| | Test Results |
|---|---|
| Com. Ex. 1 | A leakage occurs after 3 free-falls |
| Ex. 1 | No leakage even after 10 free-falls |
| Ex. 2 | No leakage even after 10 free-falls |

As shown in Table 1, the secondary batteries of Examples 1 to 3 using a gasket made of a polymer resin having a melting point of 200° C. or higher and a hardness of 100D or less were subject to no leakage even after 10 free-falls, whereas the secondary batteries of Comparative Example 1 were subject to a leakage just after 3 free-falls.

The present invention has been described with reference to the specific examples and the accompanying drawings above. However, it should be understood that the specific examples and the accompanying drawings are given by way of illustration only, not intended to limit the scope of the present invention, and thus various changes and modifications within the spirit and scope of the present invention may be made by those skilled in the art from this detailed description.

| Explanation of Reference numerals used in Drawings | |
|---|---|
| 10: Electrode Assembly | 11: Electrode Plates |
| 12: Separator | 13: First Lead |
| 14: Second Insulating Plate | 20: Case |
| 30: Cap assembly | 32: Top-cap |
| 34: PTC Device | 36: Safety Vent |
| 38: Current Interrupting Device | 40: Gasket |
| 42: Auxiliary Gasket | 50: Uneven Structure |
| 60: Protruded Structure | 70: Asphalt Coating layer |

What is claimed is:

1. A cylindrical secondary battery, comprising:
an electrode assembly having a cathode plate, an anode plate and a separator interposed therebetween;
a case for receiving the electrode assembly;
a cap assembly for sealing an open-end of the case; and
a gasket interposed between the case and the cap assembly, wherein the gasket is made of a polymer resin having a melting point of 200° C. or higher and a hardness of 100D or less, and comprising 10 to 30 mol % of a repeating unit represented by formula (I) and 70 to 90 mol % of a repeating unit represented by formula (II):

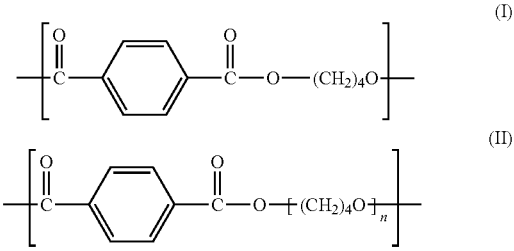

wherein n is an integer of 100 to 250.

2. The cylindrical secondary battery according to claim 1, wherein the gasket further comprises an asphalt coating layer on the surface thereof.

3. A cylindrical secondary battery, comprising:
an electrode assembly having a cathode plate, an anode plate and a separator interposed therebetween;
a case for receiving the electrode assembly;
a cap assembly for sealing an open-end of the case; and
a gasket interposed between the case and the cap assembly, the gasket being bent to have two transverse surfaces facing each other, in which one transverse surface of the gasket has an uneven structure formed thereon and the other transverse surface thereof has a protruded structure formed thereon, and an edge of the cap assembly is inserted between the uneven structure and the protruded structure,
wherein the gasket is made of a polymer resin having a melting point of 200° C. or higher and a hardness of 100D or less, and comprising 10 to 30 mol % of a repeating unit represented by formula (I) and 70 to 90 mol % of a repeating unit represented by formula (II):

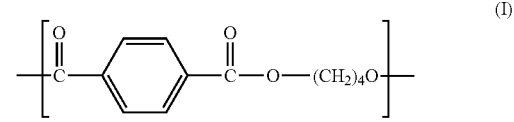

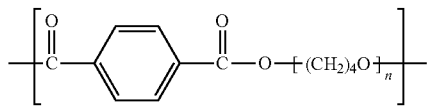

wherein n is an integer of 100 to 250.

4. The cylindrical secondary battery according to claim 3, wherein the polymer resin is selected from the group consisting of a thermoplastic polyester elastomer (TPEE), a tetrafluoride-perfluoroalkylvinylether copolymer (PFA), polybutylene terephthalate (PBT) and a mixture thereof.

5. The cylindrical secondary battery according to claim 3, wherein the cap assembly comprises:
a top-cap for sealing an open-end of the case and disposed to be in contact with the protruded structure of the gasket;
a PTC device disposed to be in contact with the top-cap; and
a safety vent disposed to be in contact with the PTC device on one surface thereof while being in contact with the uneven structure of the gasket on a part of the other surface thereof, the safety vent being electrically connected with the electrode assembly.

6. The cylindrical secondary battery according to claim 3, wherein the cap assembly comprises:
a top-cap for sealing an open-end of the case; and
a safety vent configured to be bent at both ends thereof, its one surface being in contact with all of the side, top and bottom surfaces of the top-cap, while its other surface being in contact with the uneven structure and protruded structure formed on the inner circumference surface of the gasket, and the safety vent being electrically connected with the electrode assembly.

7. The cylindrical secondary battery according to claim 5, wherein the cap assembly further comprises a current interrupt device whose top is welded to the bottom of the safety vent and bottom is connected with the electrode assembly.

8. The cylindrical secondary battery according to claim 7, which further comprises an auxiliary gasket for surrounding the outer circumference surface of the current interrupt device, as well as the gasket inserting the edge of the cap assembly therein.

9. The cylindrical secondary battery according to claim 8, wherein the gasket inserting the edge of the cap assembly therein surrounds the auxiliary gasket and the bottom surface of the current interrupt device.

10. The cylindrical secondary battery according to claim 8, wherein the gasket inserting the edge of the cap assembly therein surrounds the auxiliary gasket and the top surface of the current interrupt device.

11. The cylindrical secondary battery according to claim 7, which further comprises an auxiliary gasket interposed between the safety vent and the current interrupt device to hold them in a mutually fitted state, as well as the gasket inserting the edge of the cap assembly therein.

12. The cylindrical secondary battery according to claim 11, wherein the gasket inserting the edge of the cap assembly therein has an inclined or stepped portion in which a terminal of the current interrupt device is placed to further hold the current interrupt device between the safety vent and the gasket.

13. The cylindrical secondary battery according to claim 3, wherein the uneven structure and the protruded structure each independently have a triangular, rectangular, trapezoidal or semicircular cross-section.

14. The cylindrical secondary battery according to claim 3, wherein the uneven structure or the protruded structure further comprises a barb-shaped portion.

15. The cylindrical secondary battery according to claim 5, wherein the safety vent is made of a metal.

16. The cylindrical secondary battery according to claim 3, wherein the gasket further comprises an asphalt coating layer on the surface thereof.

* * * * *